(12) United States Patent
Pratt et al.

(10) Patent No.: US 9,679,470 B2
(45) Date of Patent: Jun. 13, 2017

(54) PROGRAMMING A UNIVERSAL REMOTE CONTROL USING AN IDENTIFYING DEVICE IMAGE

(75) Inventors: James Pratt, Round Rock, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 614 days.

(21) Appl. No.: 12/464,630

(22) Filed: May 12, 2009

(65) Prior Publication Data
US 2010/0289685 A1 Nov. 18, 2010

(51) Int. Cl.
G08C 17/02 (2006.01)
G08C 23/04 (2006.01)
H04N 21/422 (2011.01)

(52) U.S. Cl.
CPC ............ *G08C 17/02* (2013.01); *G08C 23/04* (2013.01); *G08C 2201/20* (2013.01); *G08C 2201/21* (2013.01); *G08C 2201/92* (2013.01); *H04N 21/42226* (2013.01)

(58) Field of Classification Search
CPC ............ G08C 2201/00; G08C 2201/20; G08C 2201/21; G08C 2201/92; G08C 17/02; G08C 23/04; H04N 5/4403; H04N 21/4226; H04N 21/42226
USPC ............ 341/20–35, 173–192; 348/725, 734; 398/106; 345/169
See application file for complete search history.

(56) References Cited

U.S. PATENT DOCUMENTS

| 7,460,160 B2 * | 12/2008 | Hershey et al. ............... 348/273 |
| 7,558,950 B2 * | 7/2009 | Ljung et al. .................. 713/100 |
| 7,653,212 B2 * | 1/2010 | Haughawout .......... G08C 19/28 348/734 |
| 8,094,875 B1 * | 1/2012 | Pope et al. ..................... 382/100 |
| 2003/0112423 A1 * | 6/2003 | Vig et al. ......................... 356/71 |
| 2004/0031058 A1 | 2/2004 | Reisman |
| 2004/0119894 A1 * | 6/2004 | Higgins .............. H04L 12/2805 348/734 |
| 2006/0066738 A1 * | 3/2006 | Hershey ................... H04N 5/33 348/273 |
| 2007/0296604 A1 * | 12/2007 | Koyata .................... 340/825.22 |
| 2008/0098426 A1 | 4/2008 | Candelore |
| 2009/0019061 A1 * | 1/2009 | Scannell, Jr. ................... 707/10 |
| 2009/0059090 A1 * | 3/2009 | Fan ..................... G07C 9/00031 348/734 |
| 2009/0322583 A1 * | 12/2009 | Reams et al. ................. 341/176 |
| 2010/0208145 A1 * | 8/2010 | VanDuyn et al. ............ 348/734 |

* cited by examiner

*Primary Examiner* — Hai Phan
*Assistant Examiner* — Franklin Balseca
(74) *Attorney, Agent, or Firm* — Jackson Walker L.L.P.

(57) ABSTRACT

A method and system for programming a universal remote control (URC) to operate with a new remote controlled device is disclosed. A digital image of the new device is generated and sent to a multimedia content distribution network (MCDN) server, along with MCDN account information. The digital image may be used to identify the new device. Programming codes may be retrieved and sent to client premises equipment (CPE) at an MCDN client identified by the MCDN account information. The CPE may be instructed to reprogram the URC to control the new device using the programming codes. The digital image may be sent to the server using wireless telephony service provided by the MCDN service provider.

13 Claims, 7 Drawing Sheets

PROGRAMMING A UNIVERSAL REMOTE CONTROL USING AN IDENTIFYING DEVICE IMAGE

BACKGROUND

Field of the Disclosure

The present disclosure relates to remote control devices and, more particularly, to programming universal remote control devices.

Description of the Related Art

Remote control devices provide convenient operation of equipment from a distance. Many consumer electronic devices are equipped with remote control features. Universal remote control devices may typically be configured to control multiple pieces of equipment.

DESCRIPTION OF EXEMPLARY EMBODIMENTS

Figure 1:
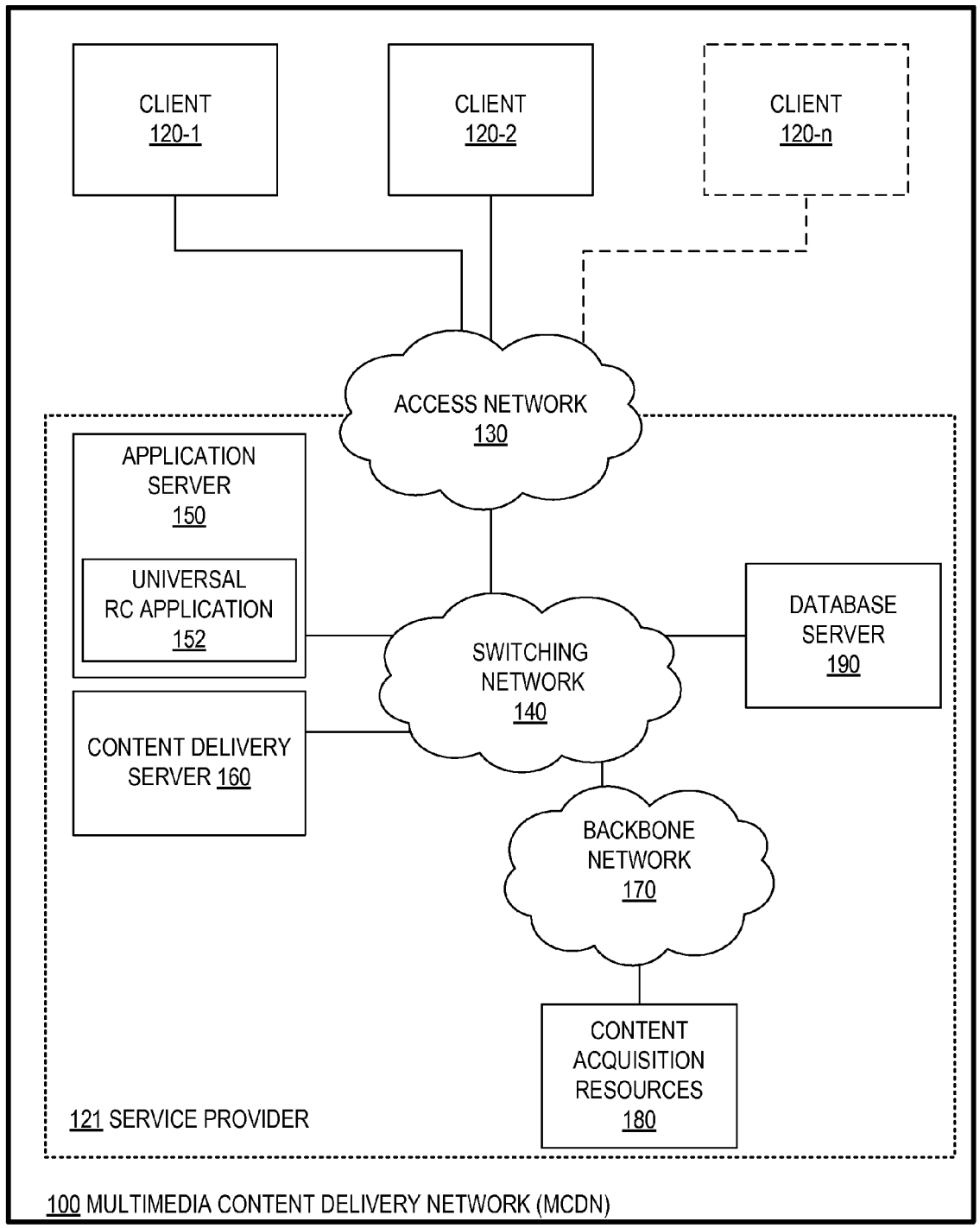
FIG. 1 is a block diagram of selected elements of an embodiment of a multimedia distribution network.

In one aspect, a disclosed method for configuring a universal remote control (URC) over a multimedia content distribution network (MCDN) includes receiving a request to configure the URC to operate a new remote-controlled (RC) device, including receiving a digital image of the new RC device and receiving an MCDN account identifier, and determining a model identifier of the new RC device from the digital image. Based on the model identifier of the new RC device, the method may further include retrieving programming codes for the new RC device, and sending the programming codes for the new RC device to client-premises equipment (CPE) of the MCDN, wherein an identity of the CPE is determined using the MCDN account identifier.

In some instances, the method further includes causing the CPE to configure the URC using the programming codes, wherein the programming codes enable the URC to remotely control the new RC device. Sending a CPE instruction may cause the CPE to configure the URC. The URC may be configured wirelessly by the CPE. The digital image may depict a photographed image of the new RC device. The digital image may depict an illustration of the new RC device. The digital image may include information for non-visible frequencies in the electromagnetic spectrum. The digital image may be recorded using a camera device. The camera device may be included in a wireless telephony device, while the request may be received from the wireless telephony device. The MCDN account identifier may be an identifier associated with the wireless telephony device.

In some cases, the method further includes receiving a confirmation from the CPE indicating that the URC has been successfully configured with the programming codes.

In a further aspect, a disclosed CPE for use within a client configuration of an MCDN includes a processor, a network adapter configured to receive multimedia content, a local transceiver, and memory media accessible to the processor, including instructions executable by the processor. The processor instructions may be executable to receive, via the MCDN, an instruction to configure a URC, receive, via the MCDN, programming codes for the URC, use the local transceiver to establish a communication link with the URC, and use the communication link to configure the URC using the programming codes. The programming codes may enable the URC to generate control signals for a new RC device.

In some embodiments, the CPE further includes a display device coupled to the processor, and further includes processor instructions executable to display an indication that the instruction has been received via the MCDN. When the URC has been configured using the programming codes, the processor instructions may be executable to display an indication that the configuration was successful. The CPE may further include processor instructions executable to initiate configuration of the URC in response to user input. The CPE may still further include processor instructions executable to send an indication via the MCDN that the configuration was successful. The local transceiver may be a local wireless transceiver.

In certain instances, the CPE may further include processor instructions executable to receive a remote control command from the URC using the local wireless transceiver. The local transceiver may be mechanically coupled to the URC.

In yet another aspect, disclosed computer-readable memory media include executable instructions for configuring a URC over an MCDN. The instructions may be executable to obtain a digital image of a new RC device, send a URC configuration request to an MCDN server, and receive an indication from the MCDN server that the URC has been successfully configured to operate the new RC device.

In certain implementations, the instructions may further be executable to generate the digital image using an optical sensor, while said instructions executable to send the request may include instructions executable to send the digital image. The digital image may include a photographed image of the new RC device. The digital image may include an illustration of the new RC device. The instructions executable to send the URC configuration request may include instructions executable to send account information for an MCDN client.

A wireless telephony device may include the optical sensor for obtaining the digital image, and may further include the memory media discussed above. Account information for an MCDN client may be associated with an identifier for the wireless telephony device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Turning now to the drawings, FIG. 1 is a block diagram illustrating selected elements of an embodiment of MCDN 100. Although multimedia content is not limited to television (TV), video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twisted pair cables, fiber optic cables, or a combination thereof. MCDN 100 may include digital subscriber line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130.

Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for multimedia content delivery network 100. Application server 150 may be any data processing system with associated software that provides applications for clients or users. Application server 150 may provide services including multimedia content services, e.g., EPGs, digital video recording (DVR) services, VOD programs, PPV programs, Internet protocol television (IPTV) portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include URC application 152, which, as will be described in detail below, is configured to cause client 120 of MCDN 100 to reprogram a URC device.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for RC devices, and programming codes for URCs.

Figure 2:
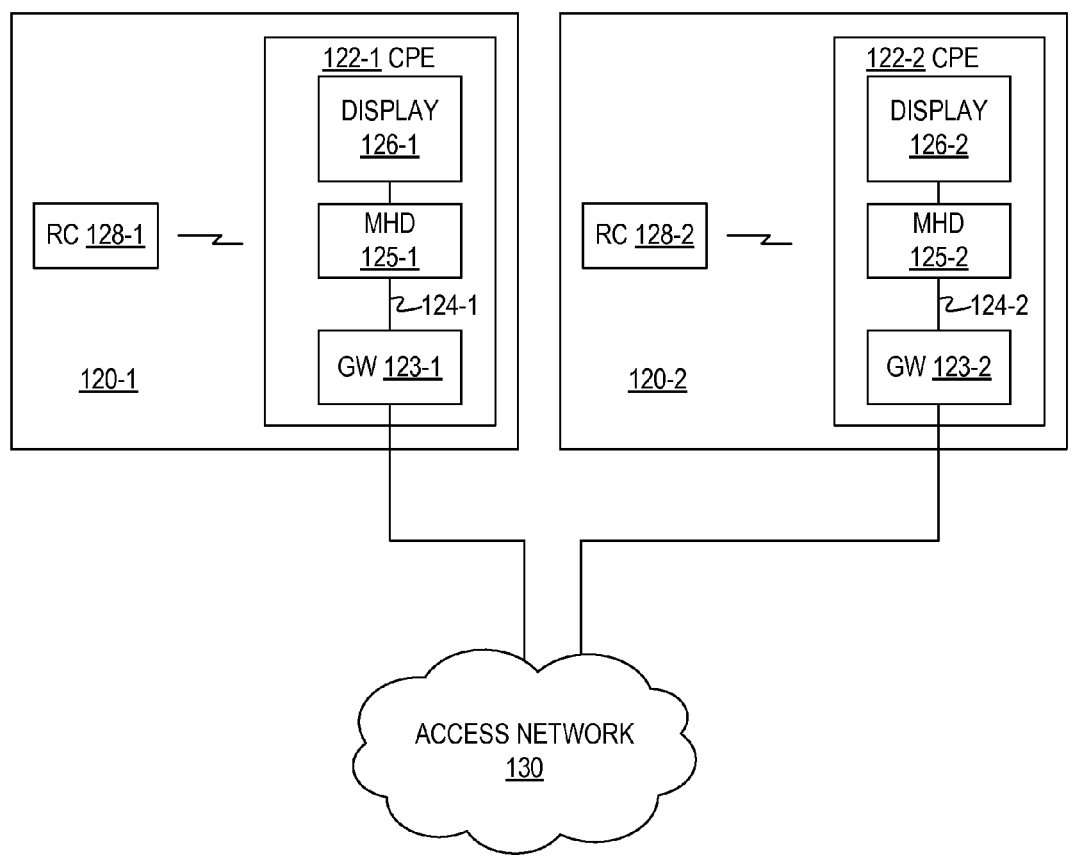
FIG. 2 is a block diagram of selected elements of an embodiment of a multimedia distribution network.

Turning now to FIG. 2, clients 120 are shown in additional detail with respect to access network 130. Clients 120 may include network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125.

In some embodiments, remote control 128 may represent a URC device that is configured to control multiple pieces of equipment. When the equipment controlled by the URC device changes, the URC device may be reprogrammed, for example, to add a new device. The URC device may be programmed using a local transceiver (see FIG. 3) coupled to CPE 122. In some cases, CPE 122 may receive network commands to reprogram the URC device, as will be described in detail below.

MHD 125 is enabled and configured to process incoming multimedia signals to produce audio and visual signals suitable for delivery to display 126 and any optional external speakers (not depicted). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a standalone set top box suitable for use in a co-axial or IP-based multimedia content delivery network.

Figure 3:
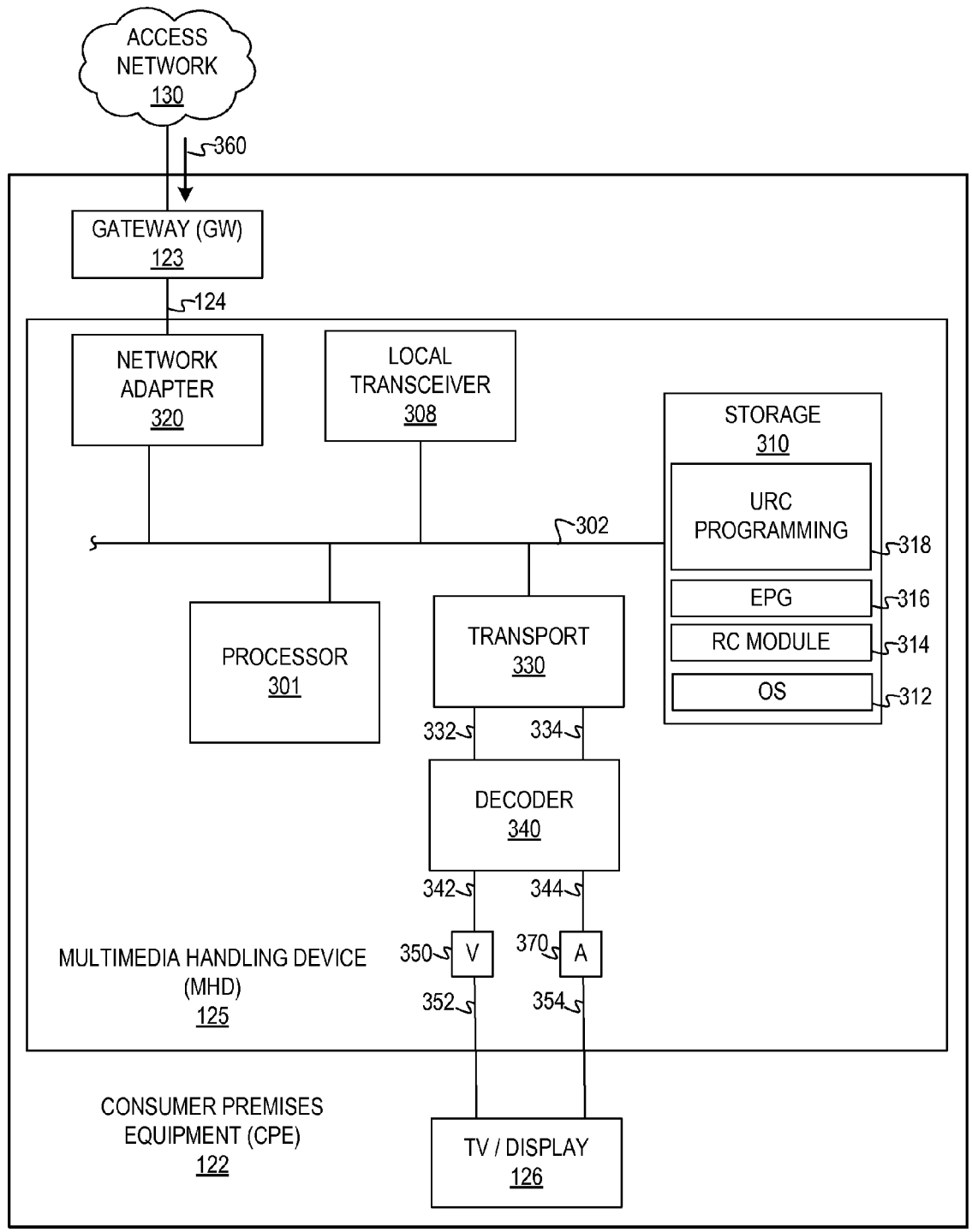
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP based content delivery networks, MHD 125, as depicted in FIG. 3, may include transport unit 330 that assembles the payloads from a sequence or set of network packets into a stream of multimedia content. In coaxial based access networks, content may be delivered as a stream that is not packet based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, EPG 316, and URC programming 318. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314. In some embodiments, URC application 152, in conjunction URC programming 318, provides functionality to reprogram or reconfigure a URC device, as will now be described in further detail below.

Local transceiver 308 represents an interface of MHD 125 for communicating with external devices, such as RC 128, or another URC device. Local transceiver 308 may provide a mechanical interface for coupling to an external device, such as a plug, socket, or other proximal adapter. In some cases, local transceiver 308 is a wireless transceiver, configured to send and receive IR or RF or other signals. A URC device configured to operate with CPE 122 may be reconfigured or reprogrammed using local transceiver 308. In some embodiments, local transceiver 308 is also used to receive commands for controlling equipment from the URC device. Local transceiver 308 may be accessed by RC module 314 for providing remote control functionality.

Figure 4:
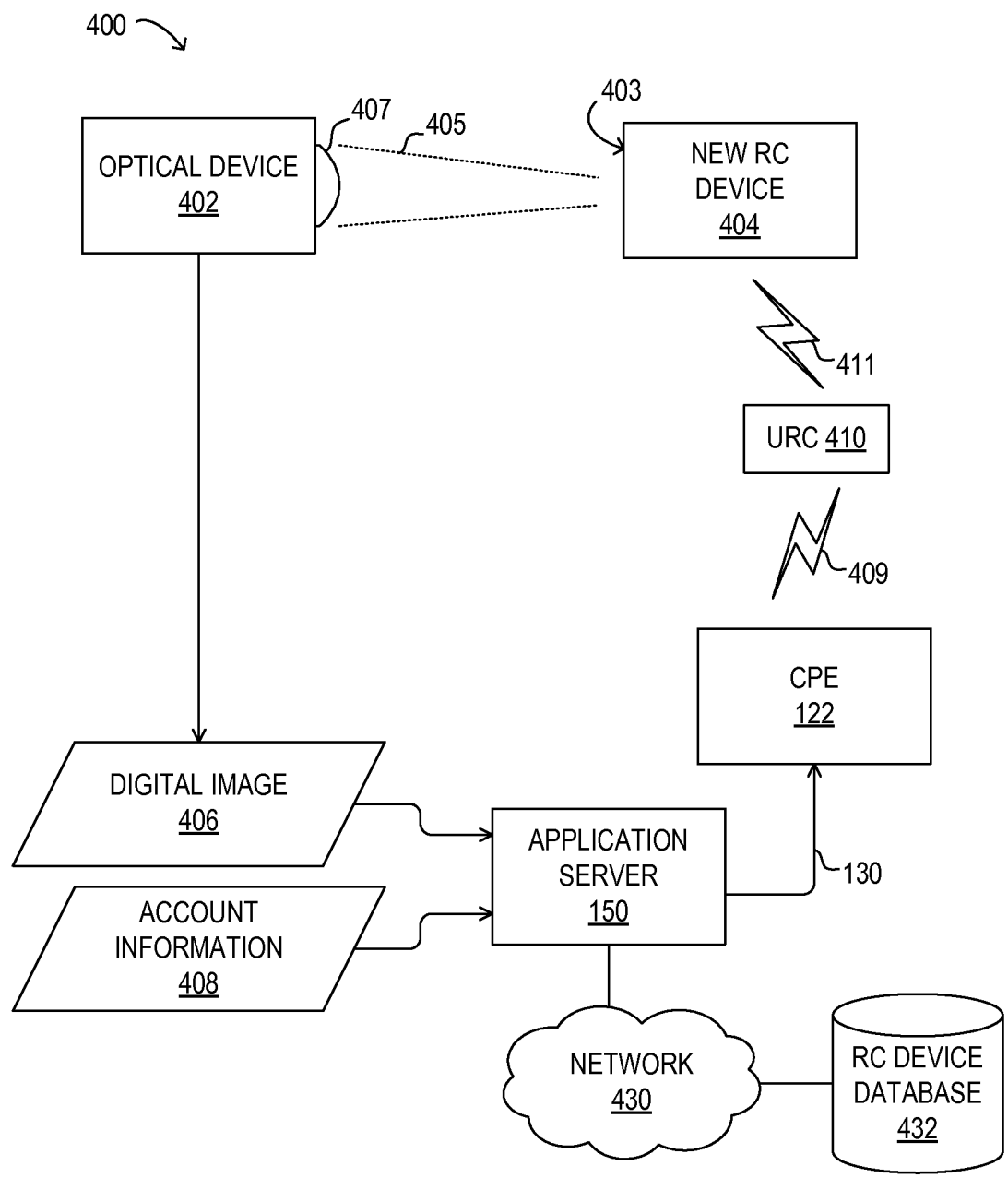
FIG. 4 is a block diagram of selected elements of an embodiment of a universal remote control system.

Turning now to FIG. 4, a block diagram of selected elements of an embodiment of URC system 400 are depicted. URC system 400 illustrates devices, interfaces and information that may be processed to program URC 410 to control new RC device 404. The reconfiguring, or reprogramming, of URC 410 may be complex, error prone, or time-consuming for a user. URC system 400 is a platform that may allow a user to reprogram URC 410 using services provided by MCDN 100. It is noted that like numbered elements in FIG. 4 represent components discussed above with respect to FIGS. 1-3.

In FIG. 4, optical device 402, URC 410, and CPE 122 may be in proximity to new RC device 404, for example at a location of an MCDN client 120. New RC device 404 refers to a piece of equipment that is introduced for use with or near CPE 122. In some cases new RC device 404 may be coupled to CPE 122. The coupling to CPE 122 may be subordinate in nature, such that new RC device 404 may be controlled by CPE 122 in response to commands or signals received by local transceiver 308 (see FIG. 3). In some embodiments, new RC device 404 may be controllable by remote control, and may be suitable for control by URC 410. When new RC device 404 is introduced, URC 410 may not yet be configured to control new RC device 404.

In FIG. 4, optical device 402 is shown having an optical aperture 407 for receiving light 405 reflected from a surface 403 of new RC device 404. Optical device 402 may comprise at least one of an optical sensor, a digital recording device, optical components (transmissive or reflective), and an optical source. In some embodiments, optical device 402 represents a digital camera, and optical aperture 407 represents a camera lens. In certain cases, optical device 402 may be a type of optical scanner, for example, a bar code reader, and may include a source (not shown in FIG. 4) for reflected light 405, while optical aperture 407 may be combination of a transmissive window and a mirror. Thus, optical device 402 may be configured to operate with an ambient light source, or an internal light source (not shown in FIG. 4).

Optical device 402 may further include an optical sensor (not shown in FIG. 4) in the form of a photodiode, phototransistor, or an array of such devices, such as a charge-coupled device (CCD) array. In some examples, optical device 402 may provide video and/or audio recording functionality.

As shown in FIG. 4, optical device 402 is configured to record light 405 from a surface 403 of new RC device 404. Surface 403 may be an outer functional surface of a piece of electronic equipment represented by new RC device 404, such as a user interface or operational front panel. Surface 403 may also represent a functional surface with mechanical or electrical interfaces, such as a connection panel for electrical and/or optical connectors, etc. Accordingly, in some embodiments, optical device 402 may acquire or scan surface 403 to obtain information about the light 405 reflected from surface 403.

In FIG. 4, optical device 402 may represent an electronic device including an optical sensor. Optical device 402 may be a camera, or a device that includes a camera, such as a wireless telephony device including a digital camera, also known as "camera phones." Accordingly, optical device 402 may include a processor and memory for processing signals and data associated with the optical sensor (not shown in FIG. 4). In some cases, optical device 402 is configured to obtain an optical scan, and transmit data representing the result of the optical scan over a wireless network (not shown in FIG. 4). In certain cases, optical device 402 may be coupled to another device, such as a cellular telephone or computer system, for transmitting data across different types of networks, including wireless networks, and/or IP networks, such as the Internet.

In some embodiments, optical device 402 generates an optical scan of surface 403, which may contain information about features of surface 403. As used herein, "light", "optics", "optical", and "optically" refer to photons of the electromagnetic spectrum. A range of frequencies is referred to herein as a "band" or a "region." The optical scan may be for a visible frequency band in the electromagnetic spectrum, which are frequencies approximately in the range of $4.3 \times 10^{14}$ to $7.5 \times 10^{14}$ Hz. An optical scan in the visible band may generate optical information in the form of a digital image, or photograph, wherein the color or intensity in the photograph represents an optical scale related to frequency of the reflected light 405, or the original color of surface 403.

The optical scan may also include information for frequencies outside the visible range, including non-visible frequencies in the radio, microwave, infrared, ultraviolet, x-ray, gamma ray bands or other frequency bands. In some cases, an optical scan may generate optical information outside the visible band, for example, for a certain optically responsive feature (not shown in FIG. 4) on surface 403 that is not evident in visible light, but may become apparent using non-visible light. In some cases, an optical sensor (not shown in FIG. 4) of optical device 402 may be sensitive to non-visible light frequencies and may so be responsive to the reflective characteristics of surface 403. Optical device 402 may be configured to operate with a visible or non-visible light source (not shown in FIG. 4).

In certain embodiments, an optically responsive feature (not shown in FIG. 4) is affixed on surface 403. In some embodiments, the feature represents a digital mark, which may include additional information, such as the identity of new RC device 404. The optically responsive feature may be an optical mark. In some cases, the electromagnetic photons represented by light 405 are in the radio or microwave bands, such that the optically responsive feature may be an RF device.

Digital image 406 thus may represent an image of surface 403 that may be characteristic and unique for new RC device 404. In some cases, digital image 406 may represent a photograph of surface 403 taken with visible light. Digital image 406 may include information from surface 403 for non-visible light frequencies, such as a pattern or a mark reflecting non-visible light frequencies.

Digital image 406 may include an indication of the identity of new RC device 404. For example, digital image 406 may include text depicting a model identifier for new RC device 404. The model identifier may be unique to new RC device 404, or to a device type embodied by new RC device 404, such as a model number, serial number, manufacturer code, configuration number, or a combination thereof. The model identifier may further be usable to obtain RC device information for new RC device 404, as will be discussed below. Application server 150 may be configured to extract information from digital image 406, such as determining the model identifier based on text in the image, or based on other pattern recognition algorithms.

As shown in FIG. 4, optical device 402 may send a URC configuration request to application server 150 for configuring URC 410 to control new RC device 404. Optical device 402 may generate digital image 406 based on reflection at surface 403. In other cases, optical device 402 may be used to generate digital image 406 from an illustration of surface 403, for example using a catalog or instruction manual depicting surface 403. Digital image 406 may be generated in response to user input on optical device 402, which may trigger the optical scan and cause information to be sent to application server 150. Along with digital image 406, account information 408 may be sent to application server 150, for processing by URC application 152 (see FIG. 1).

Account information 408 may include an indication of an MCDN account, such as offered by service provider 121 (see FIG. 1) for MCDN services. In some cases, account information 408 includes an indication of a wireless telephony account (for example, for wireless phone service for a device including optical device 402), which may be used by URC application 152 to identify the MCDN account. In certain cases, service provider 121 may also provide the wireless telephony service to the user for the wireless telephony device including, or coupled to, optical device 402, and may internally obtain MCDN account information for the user. Once the MCDN account is identified, a network identity of CPE 122 associated with the MCDN account may be resolved, and application server 150 may communicate with CPE 122 using access network 130.

As shown in FIG. 4, application server 150, executing URC application 152 (see FIG. 1), may receive digital image 406 and account information 408. Application server 150 may use digital image 406 to obtain additional information related to new RC device 404. Application server 150 may further use account information 408, as previously described, to identify CPE 122.

As illustrated in FIG. 4, application server 150 may retrieve RC device information from RC device database 432 over network 430. Network 430 may be a public or private network, while RC device database 432 may be operated by an external business entity. RC device database 432 may include device information for a variety of different RC devices, which may be controllable by URC 410. The RC device information may include programming codes for specific RC devices. Thus, application server 150 may query RC device database 432, in one embodiment, using the model identifier to retrieve programming codes for new RC device 404. It is noted that in different embodiments (not shown in FIG. 4) RC device database 432 may be included as an internal component of application server 150, may be accessed directly by optical device 402 using network 430 or another network, or may be included in optical device 402. Digital image 406 may thus, in some embodiments, include the model identifier for new RC device 404.

In FIG. 4, application server 150 may send a CPE instruction to CPE 122 over access network 130. The CPE instruction may cause CPE 122 to configure URC 410 to control new RC device 404. The CPE instruction may include, or may be followed by, programming codes for new RC device 404. CPE 122 may establish a communication link 409 to URC 410, as shown in FIG. 4. In one embodiment, communication link 409 is implemented by local transceiver 308. Communication link 409 may be a wireless or a mechanically connected interface that is used to configure URC 410. In one embodiment, URC 410 is configured by CPE 122 to use programming codes for new RC device 404 for prescribed control functionality using communication link 409. CPE 122 may display an indication of being ready to reprogram URC 410 and/or an indication that communication link 409 to URC 410 has been established. In some cases, CPE 122 may wait for user input before proceeding to configure URC 410.

After URC 410 has been programmed, or reprogrammed, CPE 122 may receive a confirmation via communication link 409, and may display an indication that URC 410 has been successfully configured to control new RC device 404. In some cases, CPE 122 may transmit the confirmation/indication of successful URC configuration to application server 150, which may, in turn, send a confirmation to optical device 402, or another device originating the URC configuration request.

After being successfully configured, URC 410 may control new RC device 404 using communication link 411. In some embodiments, communication links 409 and 411 are the same link (not shown in FIG. 4) to CPE 122, which is, in turn, coupled to control new RC device 404.

Figure 5:
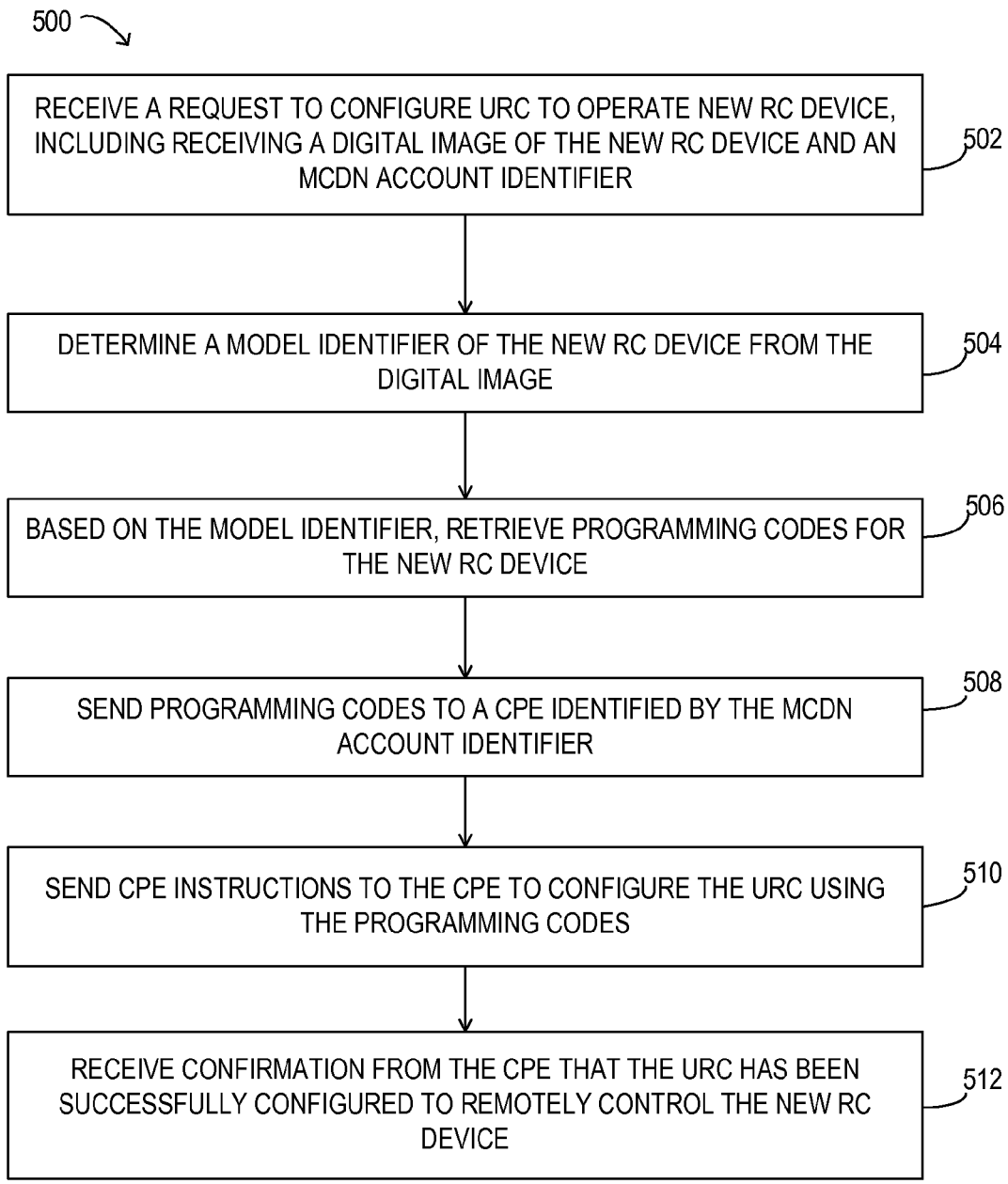
FIG. 5 illustrates an embodiment of a method for programming a universal remote control device.

Turning now to FIG. 5, an embodiment of method 500 for programming a URC is illustrated. In one embodiment, method 500 is performed by URC application 152 executing on application server 150. Method 500 may also be performed in conjunction with functionality provided by a client device on the MCDN, such as URC programming 318 executing on MHD 125 of CPE 122. It is noted that certain operations described in method 500 may be optional or may be rearranged in different embodiments. In method 500, it is assumed that a new RC device 404 has been introduced alongside CPE 122 of MCDN client 120, and that URC 410 is capable of controlling new RC device 404 (see FIG. 4).

A request to configure a URC to operate a new RC device may be received, including receiving a digital image of the new RC device and an MCDN account identifier (operation 502). In certain embodiments, the request in operation 502 is a URC configuration request sent by a wireless telephony device including optical device 402. The digital image may be generated by optical device 402 and transmitted via wireless network. In some embodiments, optical device 402 is coupled to a computing device, while the digital image is transmitted by the computing device over a computer network, such as the Internet.

From the digital image, a model identifier of the new RC device may be determined (operation 504). Application server 150 may determine the model identifier based on text in digital image 406, or based on other pattern recognition algorithms applied to digital image 406. Based on the model identifier, programming codes for the new RC device may be retrieved (operation 506). In certain instances, programming codes may be retrieved from RC device database 432 using the model identifier for the new RC device 404. The programming codes may then be sent to a CPE identified by the MCDN account identifier (operation 508). CPE instructions may be sent to the CPE to configure the URC using the programming codes (operation 510). In one embodiment, a CPE instruction to reprogram URC 410 with the programming codes is sent to CPE 122 over access network 130. Receiving the CPE instruction may cause CPE 122 to initiate reprogramming of URC 410. A confirmation from the CPE may then be received that the URC has been successfully configured to remotely control the new RC device (operation 512).

Figure 6:
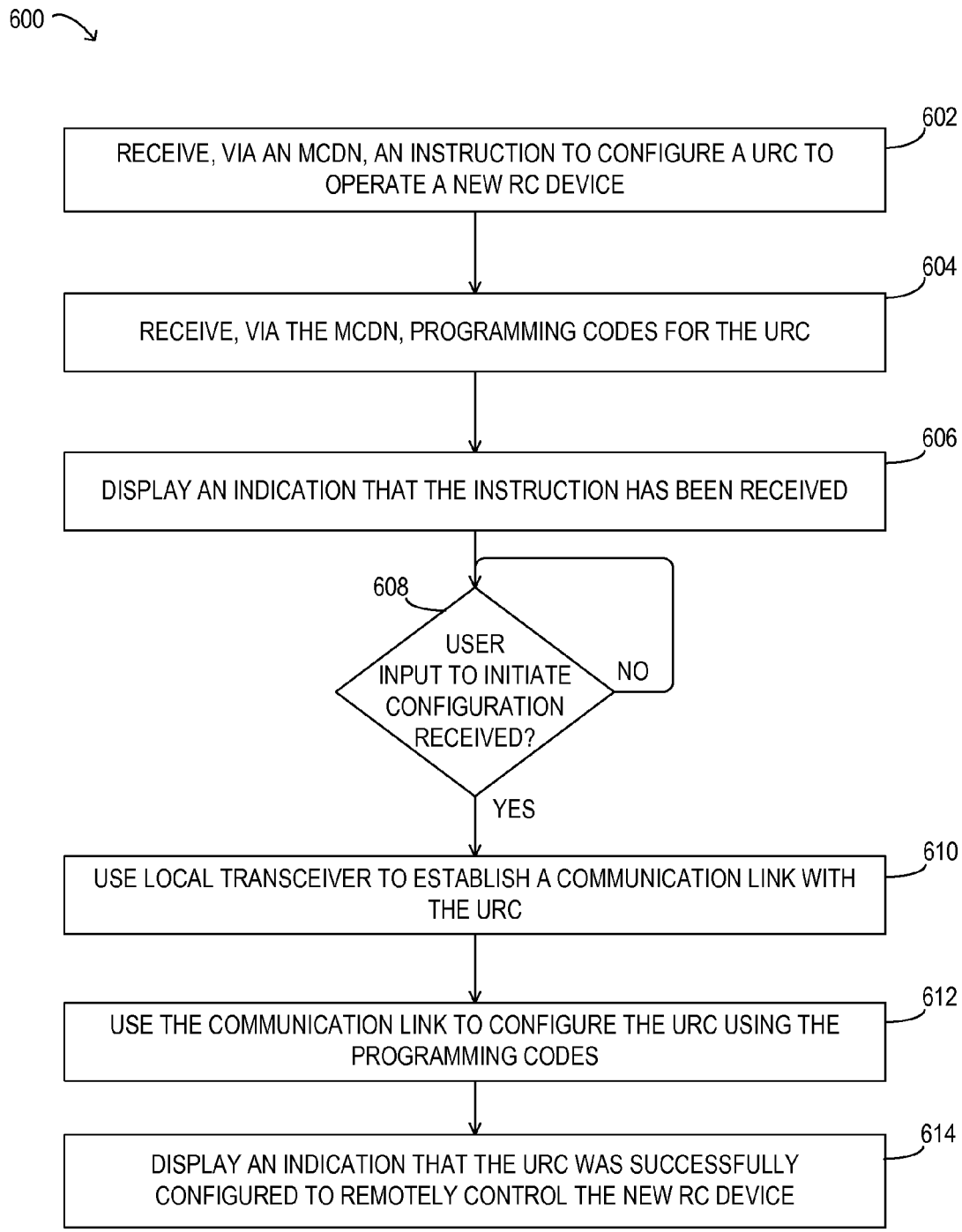
FIG. 6 illustrates an embodiment of a method for programming a universal remote control device.

Turning now to FIG. 6, an embodiment of method 600 for programming a URC is illustrated. In one embodiment, method 600 is performed by URC programming 318 executing on MHD 125 of CPE 122. Method 600 may also be performed in conjunction with functionality provided by URC application 152 executing on application server 150. It is noted that certain operations described in method 600 may be optional or may be rearranged in different embodiments. In method 600, it is assumed that a new RC device 404 has been introduced alongside CPE 122 of MCDN client 120, and that URC 410 is capable of controlling new RC device 404 (see FIG. 4).

An instruction to configure a URC to operate a new RC device may be received via the MCDN (operation 602). In certain embodiments, the instruction in operation 602 is a CPE instruction issued by application server 150 over access network 130. Programming codes for the URC may then be received via the MCDN (operation 604). The programming codes may enable URC 410 to remotely control new RC device 404. An indication that the instruction has been received may be displayed (operation 606). In some embodiments, CPE 122 may display the indication in operation 606 using display 126. In certain instances, the indication in operation 606 may be displayed on a page of EPG 316.

A decision is then made whether or not user input to initiate configuration has been received (operation 608). In certain implementations, the user input may be received by CPE 122 using URC 410, or RC 128. If the result of operation 608 is NO, then operation 608 repeats, or waits for user input. If the result of operation 608 is YES, then a local transceiver may be used to establish a communication link with the URC (operation 610). Local transceiver 308 may be used to wirelessly establish communication link 409 to URC 410. The communication link may be used to configure the URC using the programming codes (operation 612). An indication may be displayed that the URC was successfully configured to remotely control the new RC device (operation 614). The indication in operation 614 may be a confirmation displayed by CPE 122.

Figure 7:
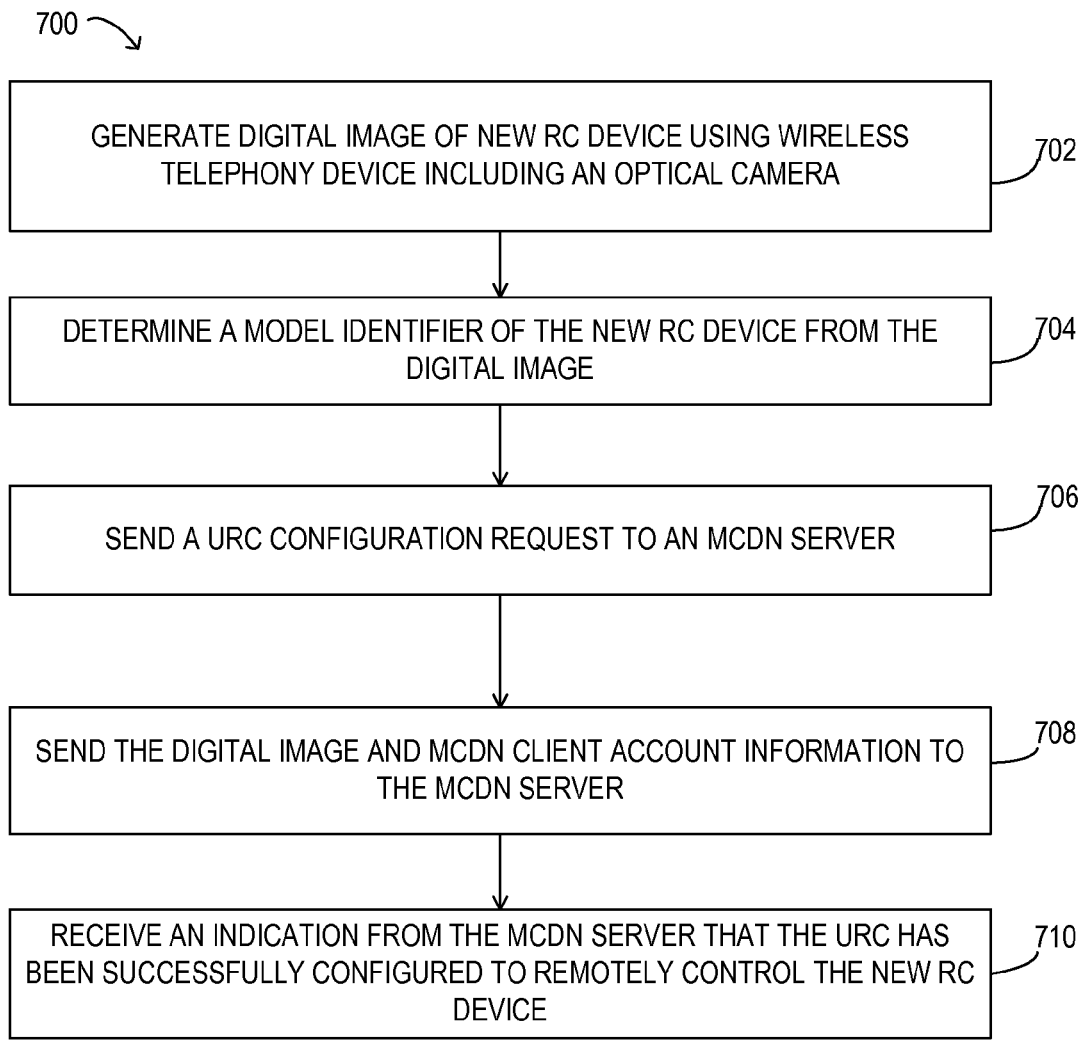
FIG. 7 illustrates an embodiment of a method for programming a universal remote control device.

Turning now to FIG. 7, an embodiment of method 700 for programming a URC is illustrated. In one embodiment, method 700 is performed by optical device 402, or a device coupled to optical device 402, or a device that includes optical device 402. Method 700 may also be performed in conjunction with functionality provided by URC application 152 executing on application server 150, and/or with functionality provided by URC programming 318 executing on MHD 125 of CPE 122. It is noted that certain operations described in method 700 may be optional or may be rearranged in different embodiments. In method 700, it is assumed that a new RC device 404 has been introduced alongside CPE 122 of MCDN client 120, and that URC 410 is capable of controlling new RC device 404 (see FIG. 4).

A digital image of a new RC device may be obtained using a wireless telephony device including an optical camera (operation 702). The optical device 402 may represent the wireless telephony device including the optical camera. A model identifier for the new RC device may be determined from the digital image (operation 704). In some cases, the wireless telephony device may execute an application to analyze the digital image to determine the model identifier. The model identifier for the new RC device may be determined from a digital mark. The model identifier may be used to retrieve programming codes for the URC. A URC configuration request may be sent to an MCDN server (operation 706). The URC configuration request may be received by application server 150. The digital image and MCDN client account information may be sent to the MCDN server (operation 708). In some cases, account information for the wireless telephony service provided to the wireless telephony device may serve as MCDN account information in operation 708. An indication may be received from the MCDN server that the URC has been successfully configured to remotely control the new RC device (operation 710). After receiving the indication, URC 410 may be used to remotely control new RC device 404.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A remote control method, comprising:
    receiving, by a server of a multimedia service provider, camera data from a mobile device that includes a camera having an optical sensor sensitive to non-visible light frequencies, wherein the camera data includes visible data, indicative of visible light frequencies reflected from a remote-controlled device, and non-visible data indicative of non-visible light frequencies reflected from the remote-controlled device;
    determining a multimedia network account based on an identifier of the mobile device;
    determining a network identity of a multimedia handling device associated with the account wherein the multimedia handling device comprises a set top box configured to decode encrypted content received from the multimedia service provider via an access network of the multimedia service provider;
    identifying the remote-controlled device based on non-visible light frequencies reflected by a non-visible digital mark wherein the non-visible digital mark comprises an optically responsive feature located on a surface of the remote-controlled device, wherein the optically response feature is not evident in visible light but becomes apparent using non-visible light;
    retrieving programming codes for the remote-controlled device; and
    sending, by the server, the programming codes to the set top box via a residential gateway coupled between the set top box and the access network, wherein an identity of the set top box is determined based on a multimedia service provider account associated with the user;
    sending a remote control configuration instruction via the access network to the set top box wherein the set top box is configured to respond to receipt of the remote control configuration instruction by:
   displaying, on a page of an electronic programming guide, an indication that the remote control configuration instruction has been received;
   determining whether user input to initiate configuration has been received from an original remote control of the remote controlled device; and
   subject to determining that the user input to initiation configuration has been received:
     reprogramming a universal remote control in accordance with the programming codes, wherein reprogramming includes establishing, by a wireless transceiver of the set top box, a wireless communication link with the universal remote control; and
     responsive to successful configuration of the universal remote control:
       returning a confirmation to the server; and
       displaying an indication of the successful configuration.

2. The method of claim 1, wherein the programming codes enable the universal remote control to remotely control the remote-controlled device.

3. The method of claim 2, wherein the wireless transceiver comprises a local wireless transceiver.

4. The method of claim 3, wherein the local wireless transceiver is configured to send and receive infrared (IR) signals.

5. The method of claim 1, wherein the programming codes enable the set top box to remotely control the remote-controlled device without the universal remote control.

6. The method of claim 1, wherein the camera data comprises an optical scan.

7. The method of claim 1, wherein the camera data includes ultra violet frequency data.

8. A multimedia service provider application server, comprising:
   a processor; and
   memory storage media accessible to the processor, including processor executable instructions that, when executed by the processor, cause the processor to perform operations comprising:
   receiving, by a server of a multimedia service provider, camera data from a mobile device that includes a camera having an optical sensor sensitive to non-visible light frequencies, wherein the camera data includes visible data, indicative of visible light frequencies reflected from a remote-controlled device, and non-visible data indicative of non-visible light frequencies reflected from the remote-controlled device;
   determining a multimedia network account based on an identifier of the mobile device;
   determining a network identity of a multimedia handling device associated with the account wherein the multimedia handling device comprises a set top box configured to decode encrypted content received from the multimedia service provider via an access network of the multimedia service provider:
   identifying the remote-controlled device based on non-visible light frequencies reflected by a non-visible digital mark wherein the non-visible digital mark comprises an optically responsive feature located on a surface of the remote-controlled device, wherein the optically response feature is not evident in visible light but becomes apparent using non-visible light;
   retrieving programming codes for the remote-controlled device; and
   sending, by the server, the programming codes to the set top box via a residential gateway coupled between the set top box and the access network, wherein an identity of the set top box is determined based on a multimedia service provider account associated with the user;
   sending a remote control configuration instruction via the access network to the set top box wherein the set top box is configured to respond to receipt of the remote control configuration instruction by:
     displaying, on a page of an electronic programming guide, an indication that the remote control configuration instruction has been received;
     determining whether user input to initiate configuration has been received from an original remote control of the remote controlled device; and
     subject to determining that the user input to initiation configuration has been received:
       reprogramming a universal remote control in accordance with the programming codes, wherein reprogramming includes establishing, by a wireless transceiver of the set top box, a wireless communication link with the universal remote control; and
       responsive to successful configuration of the universal remote control:
         returning a confirmation to the server; and
         displaying an indication of the successful configuration.

9. The application server of claim 8, wherein the programming codes enable the universal remote control to remotely control the remote-controlled device.

10. The application server of claim 9, wherein the wireless transceiver comprises a local wireless transceiver.

11. A computer-readable memory device, including processor executable program instructions that, when executed by a processor, cause the processor to perform operations comprising:
   receiving, by an application server of a multimedia service provider, camera data from a mobile device that includes a camera having an optical sensor sensitive to non-visible light frequencies, wherein the camera data is includes visible data, indicative of visible light frequencies reflected from a remote-controlled device, and non-visible data indicative of non-visible light frequencies reflected from the remote-controlled device;
   determining a multimedia network account based on an identifier of the mobile device;
   determining a network identity of a multimedia handling device associated with the account wherein the multimedia handling device comprises a set top box configured to decode encrypted content received from the multimedia service provider via an access network of the multimedia service provider;
   identifying the remote-controlled device based on non-visible light frequencies reflected by a non-visible digital mark wherein the non-visible digital mark comprises an optically responsive feature located on a surface of the remote-controlled device, wherein the optically response feature is not evident in visible light but becomes apparent using non-visible light;
   retrieving programming codes for the remote-controlled device; and
   sending, by the application server, the programming codes to the set top box via a residential gateway coupled between the set top box and the access network, wherein a network identity of the set top box is determined based on a multimedia service provider account associated with the user;

sending a remote control configuration instruction via the access network to the set top box wherein the set top box is configured to respond to receipt of the remote control configuration instruction by:

displaying, on a page of an electronic programming guide, an indication that the remote control configuration instruction has been received;

determining whether user input to initiate configuration has been received from an original remote control of the remote controlled device; and subject to determining that the user input to initiation configuration has been received:

reprogramming a universal remote control in accordance with the programming codes, wherein reprogramming includes establishing, by a wireless transceiver of the set top box, a wireless communication link with the universal remote control; and responsive to successful configuration of the universal remote control:

returning a confirmation to the server; and displaying an indication of the successful configuration.

12. The memory device of claim 11, wherein the programming codes enable the universal remote control to remotely control the remote-controlled device.

13. The memory device of claim 11, wherein the programming codes enable the set top box to remotely control the remote-controlled device directly, without the universal remote control.

* * * * *